(12) United States Patent
Kang et al.

(10) Patent No.: US 8,937,932 B2
(45) Date of Patent: Jan. 20, 2015

(54) METHOD AND APPARATUS FOR PROVIDING SERVICE

(71) Applicant: Samsung Electronics Co., Ltd., Gyeonggi-do (KR)

(72) Inventors: Tae-young Kang, Seoul (KR); Hee-chul Jeon, Gyeonggi-do (KR); Hye-rin Kim, Seoul (KR); Da-hye Park, Gyeonggi-do (KR); Won-young Choi, Gyeonggi-do (KR); Seung-hwan Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 145 days.

(21) Appl. No.: 13/631,161

(22) Filed: Sep. 28, 2012

(65) Prior Publication Data

US 2013/0083784 A1 Apr. 4, 2013

(30) Foreign Application Priority Data

Sep. 29, 2011 (KR) ........................ 10-2011-0098937

(51) Int. Cl.
*H04W 84/12* (2009.01)
*H04W 4/20* (2009.01)
*H04W 36/30* (2009.01)
*H04W 4/04* (2009.01)

(52) U.S. Cl.
CPC .............. *H04W 4/206* (2013.01); *H04W 36/30* (2013.01); *H04W 4/04* (2013.01)
USPC .......................................... 370/338; 370/328

(58) Field of Classification Search
None
See application file for complete search history.

(56) References Cited

U.S. PATENT DOCUMENTS

| 6,414,635 | B1 | | 7/2002 | Stewart et al. |
|---|---|---|---|---|
| 6,631,122 | B1 | | 10/2003 | Arunachalam et al. |
| 6,831,908 | B2 | * | 12/2004 | Kikuchi ........................ 370/338 |
| 7,366,523 | B2 | * | 4/2008 | Viikari et al. .............. 455/456.1 |
| 7,590,418 | B1 | * | 9/2009 | Thomson ..................... 455/433 |
| 7,684,798 | B2 | * | 3/2010 | Sengodan et al. ............ 455/436 |
| 7,849,177 | B2 | * | 12/2010 | Uhlik ............................ 709/223 |
| 7,856,209 | B1 | * | 12/2010 | Rawat ........................ 455/67.11 |
| 8,045,576 | B2 | * | 10/2011 | Tsfaty et al. .................. 370/458 |
| 8,179,872 | B2 | * | 5/2012 | Bienfait et al. ............... 370/338 |
| 8,180,339 | B2 | * | 5/2012 | Douglas et al. .............. 455/424 |
| 8,180,369 | B1 | * | 5/2012 | Sheikh ........................ 455/456.1 |
| 8,294,568 | B2 | * | 10/2012 | Barrett ..................... 340/539.11 |
| 8,351,420 | B2 | * | 1/2013 | Linkola et al. ................ 370/352 |
| 8,370,062 | B1 | * | 2/2013 | Starenky et al. .............. 701/467 |
| 2003/0108016 | A1 | * | 6/2003 | Bonta ........................... 370/338 |

(Continued)

FOREIGN PATENT DOCUMENTS

KR 1020100073814 7/2010

OTHER PUBLICATIONS

Kitti Wongthavarawat et al., "IEEE 802.16 Based Last Mile Broadband Wireless Military Networks with Quality of Service Report", 2003.

*Primary Examiner* — Bunjob Jaroenchonwanit
(74) *Attorney, Agent, or Firm* — The Farrell Law Firm, P.C.

(57) ABSTRACT

A method and apparatus for providing a service in a service providing device are provided. The method includes receiving, from a terminal, information about a wireless transmitter/receiver whose vicinity the terminal is located within; determining a differentiated service to be provided to the terminal according to the received information about the wireless transmitter/receiver; and providing the determined differentiated service to the terminal.

24 Claims, 4 Drawing Sheets

(56) References Cited

U.S. PATENT DOCUMENTS

| | | | |
|---|---|---|---|
| 2005/0058112 A1* | 3/2005 | Lahey et al. | 370/338 |
| 2005/0130634 A1* | 6/2005 | Godfrey | 455/414.1 |
| 2008/0037482 A1* | 2/2008 | Douglas et al. | 370/338 |
| 2009/0046658 A1* | 2/2009 | Krishnaswamy | 370/331 |
| 2010/0067507 A1* | 3/2010 | Park | 370/338 |
| 2010/0113063 A1* | 5/2010 | Han et al. | 455/456.1 |
| 2010/0246419 A1* | 9/2010 | Batta et al. | 370/252 |
| 2011/0103298 A1* | 5/2011 | Walter et al. | 370/328 |
| 2012/0159472 A1* | 6/2012 | Hong et al. | 717/178 |
| 2012/0170560 A1* | 7/2012 | Han et al. | 370/338 |
| 2012/0173373 A1* | 7/2012 | Soroca et al. | 705/26.3 |
| 2012/0254246 A1* | 10/2012 | Kerger et al. | 707/780 |
| 2012/0265603 A1* | 10/2012 | Corner et al. | 705/14.39 |
| 2012/0281677 A1* | 11/2012 | Lee | 370/331 |
| 2012/0324076 A1* | 12/2012 | Zerr et al. | 709/223 |
| 2013/0018701 A1* | 1/2013 | Dusig et al. | 705/7.32 |
| 2013/0024322 A1* | 1/2013 | Tuchman et al. | 705/26.35 |
| 2013/0053005 A1* | 2/2013 | Ramer et al. | 455/414.1 |

\* cited by examiner

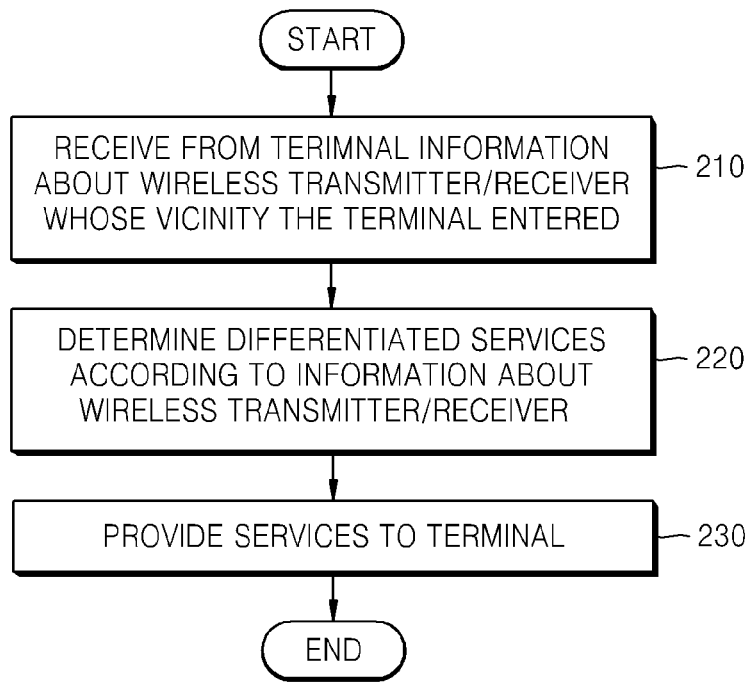
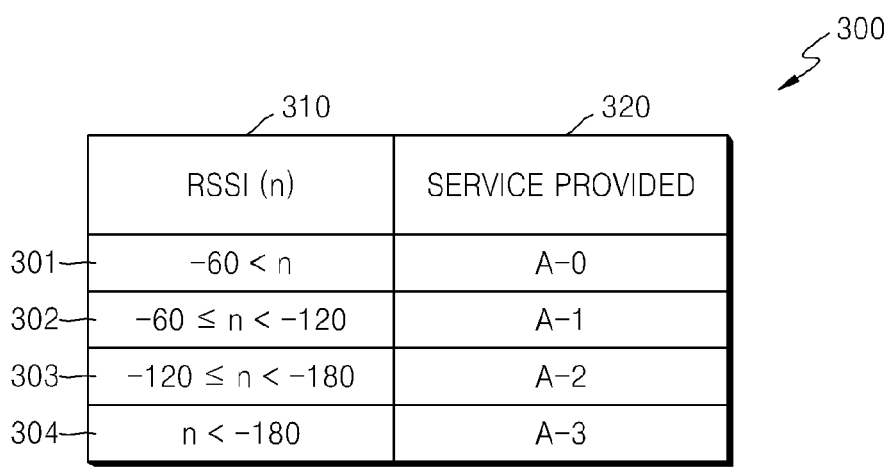

METHOD AND APPARATUS FOR PROVIDING SERVICE

PRIORITY

This application claims priority under 35 U.S.C. §119(a) to Korean Patent Application No. 10-2011-0098937, filed on Sep. 29, 2011, in the Korean Intellectual Property Office, the entire content of which is incorporated herein by reference.

BACKGROUND OF THE INVENTION

1. Field of the Invention

The present invention relates generally to a method and apparatus for providing a service, and more particularly, to a method and apparatus for providing differentiated services to a terminal that has received a signal from a wireless transmitter/receiver.

2. Description of the Related Art

In order to provide wireless communication services, a Wireless Local Area Network (WLAN) access point is installed. WLAN is a near field communication network within a predetermined distance from an installation location of an Access Point (AP), which is a wireless transmitter/receiver. One such commonly used technique is Wireless Fidelity (Wi-Fi).

As sales of mobile devices involving a lot of information traffic, such as smartphones, tablet Personal Computers (PCs), mobile PCs, etc., are increasing worldwide, production of Wi-Fi devices is rapidly increasing every year. In order to accommodate this trend, wireless APs (and/or another wireless transmitters/receivers) for sending wireless signals, (e.g., a beacon) are being installed in many locations.

Current wireless transmitters/receivers provide wireless transmitter/receiver services to mobile devices that are within a vicinity of the transmitters/receivers.

SUMMARY OF THE INVENTION

The present invention provides a method and apparatus for providing differentiated services to a terminal according to a signal intensity of a signal that is sent from a wireless transmitter/receiver and received by the terminal.

According to an aspect of the present invention, there is provided a method for providing a service in a service providing device. The method includes receiving, from a terminal, information about a wireless transmitter/receiver whose vicinity the terminal is located within; determining a differentiated service to be provided to the terminal according to the received information about the wireless transmitter/receiver; and providing the determined differentiated service to the terminal.

According to another aspect of the present invention, a service providing apparatus is provided. The service providing apparatus includes a communication unit for receiving, from a terminal, information corresponding to a wireless transmitter/receiver whose vicinity the terminal is located within; and a control unit for determining a differentiated service to be provided to the terminal according to the received information about the wireless transmitter/receiver and providing the service to the terminal.

BRIEF DESCRIPTION OF THE DRAWINGS

The above and other aspect, features, and advantages of the present invention will become more apparent from the following detailed description taken in conjunction with the accompanying drawings in which:

FIG. 2 is a flowchart illustrating a method of providing a service according to an embodiment of the present invention;

FIG. 3 illustrates a table showing differentiated services stored in a content storage device according to an embodiment of the present invention;

DETAILED DESCRIPTION OF EMBODIMENTS OF THE INVENTION

The present invention will now be described more fully with reference to the accompanying drawings. In the following description, a detailed explanation of known related functions and constitutions may be omitted to avoid unnecessarily obscuring the subject matter of the present invention.

Figure 1:
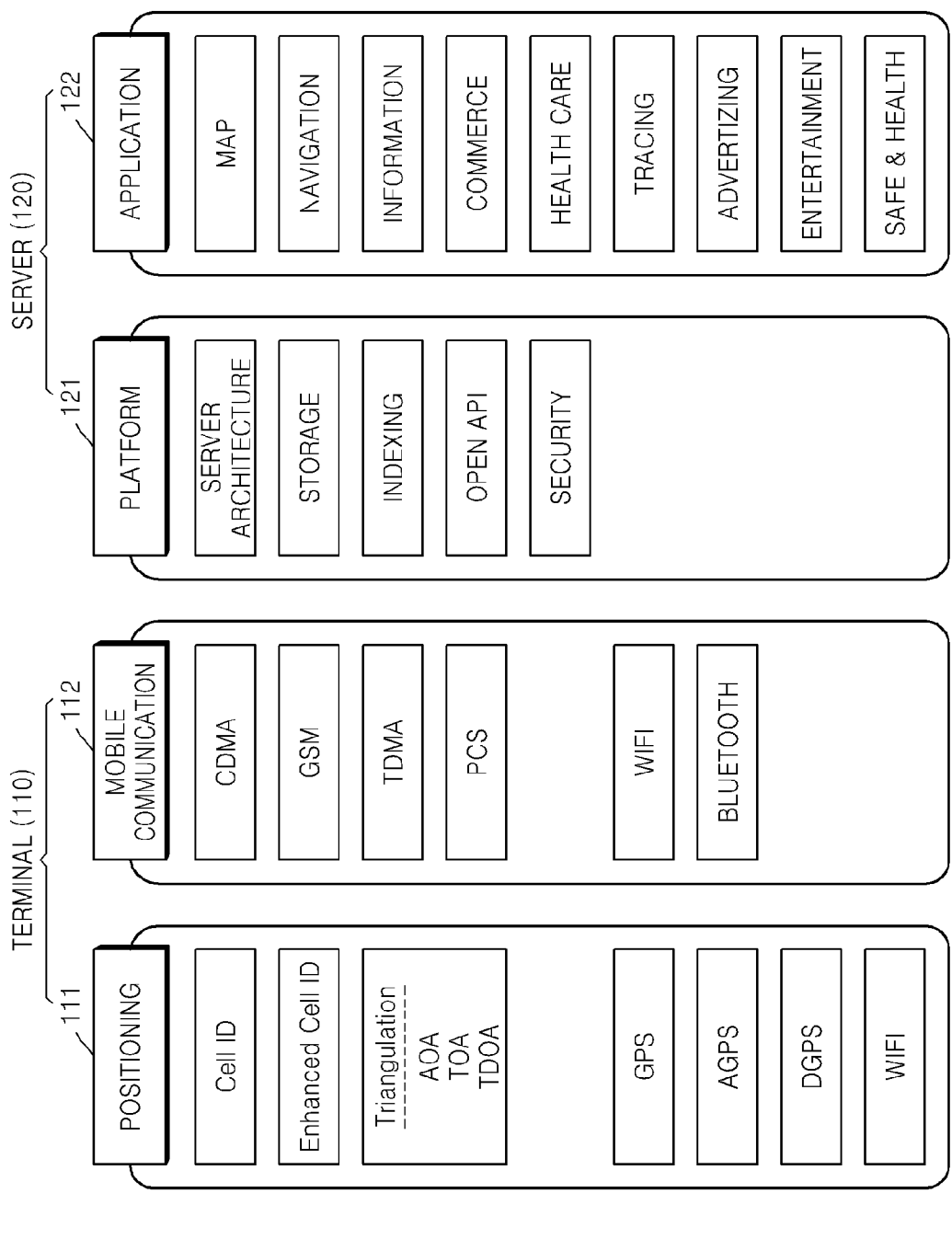
FIG. 1 is a schematic diagram illustrating a location-based service providing system according to an embodiment of the present invention.

FIG. 1 is a schematic diagram illustrating a location-based service providing system according to an embodiment of the present invention.

Referring to FIG. 1, the location-based service providing system includes a terminal 110 and a server 120; the terminal 110 includes a positioning module 111 and a mobile communication module 112, and the server 120 includes a platform module 121 and an application module 122.

The positioning module 111 checks a location of the terminal 110, by using techniques such as cell IDentification (ID) determination, enhanced cell ID determination, triangulation such as Angle of Arrival (AoA), Time of Arrival (ToA), Time Difference of Arrival (TDoA), and/or technologies such as Global Positioning System (GPS), Assisted GPS (AGPS), Differentiated GPS (DGPS) or Wireless Fidelity (WiFi). However, these positioning examples are non-limiting, and other such techniques may be used in accordance with embodiments of the present invention.

The mobile communication module 112 performs communication between the terminal 110 and the server 120. Mobile communication techniques used in accordance with embodiments of the present invention may include Code Division Multiple Access (CMDA), Global System for Mobile Communications (GSM), Time Division Multiple Access (TDMA), and Personal Communication Service (PCS). Additional mobile communication techniques related to near field communication in accordance with embodiments of the present invention may include WiFi and Bluetooth communications. However, these mobile communication techniques are non-limiting examples, and other such mobile communication techniques may be used in accordance with embodiments of the present invention.

The platform module 121 may include technologies such as server architecture, storage, indexing, open Application Programming Interface (API), and security technologies. The server architecture technology is a location-based processing technology based on location-based functions such as obtaining a location from a location obtaining server in response to a terminal-side location information request, management of location information and processing of personal or collective location information, tracing of movement paths, etc. Herein, storage technology refers to a technology for storing a large amount of information and managing the same. Indexing technology may refer to a technology for systemizing location information or its relevant information in optimized forms and configuring the same such that the information may be searched easily. Open API technology refers to a technology for connecting other service providers to provide location information and relevant information. Security technology refers to a technology for controlling access of users such as user profile management, authorization, or security. The structure of the platform module 121 as illustrated in FIG. 1 is provided an example, and embodiments of the present invention is not limited thereto.

The application module 122 includes applications with which location-based services are provided to the terminal 110. Examples of applications included within the application module 122 include map, navigation, information, commerce, health care, tracing, advertizing, entertainment, and health and safety applications. However, other such applications may be included within the application module 122 in accordance with embodiments of the present invention.

FIG. 2 is a flowchart illustrating a method of providing a service according to an embodiment of the present invention.

Referring to FIG. 2, in step 210, when a terminal enters a vicinity of a wireless transmitter/receiver, a service providing apparatus receives, from the terminal, information about the wireless transmitter/receiver. The vicinity of the wireless transmitter/receiver may be an area in which the wireless transmitter/receiver can communicate with a terminal. The terminal receives a signal including unique information of the wireless transmitter/receiver broadcast by the wireless transmitter/receiver and address information of a server for services to the terminal. According to the present example according to embodiment of the present invention, the wireless transmitter/receiver may be a beacon or an AP. In the current embodiment, the unique information of a wireless transmitter/receiver may include at least one of a Media Access Control (MAC) address, a Service Set IDentifier (SSID), and a Basic Service Set IDentifier (BSSID). When receiving a signal from the wireless transmitter/receiver, the terminal detects a reception intensity of the received signal. Reception intensity may be in the form of a Received Signal Strength Indication (RSSI).

Thereafter, the information about the wireless transmitter/receiver including the unique information of the wireless transmitter/receiver and reception intensity is transmitted to the service providing apparatus. Also, the terminal may transmit IDentification (ID) information of the terminal to the service providing apparatus, and when receiving the ID of the terminal, the service providing apparatus stores the same. If it is possible to calculate a distance from the terminal to the wireless transmitter/receiver according to signal intensity, the terminal may transmit information indicating the calculated distance.

In step 220, the service providing apparatus determines differentiated services according to information about the wireless transmitter/receiver. The service providing apparatus determines differentiated services according to the unique information of the wireless transmitter/receiver and/or signal intensity included in the information about the wireless transmitter/receiver. The signal intensity is reference information based on which a distance between the wireless transmitter/receiver and the terminal may be calculated. Accordingly, the service providing apparatus provides differentiated services to the terminal according to the distance between the wireless transmitter/receiver and the terminal. Therefore, the terminal may receive, not just a simple service, but differentiated services according the distance between the wireless transmitter/receiver and the terminal. Services may include information such as contents or service Uniform Resource Locators (URLs). Other such information and/or services may be provided in accordance with embodiments of the present invention.

FIG. 3 illustrates a table 300 showing differentiated services stored in a content storage device according to an embodiment of the present invention.

Referring to FIG. 3, the table 300 includes an RSSI field 310, which indicates signal intensity, and a service item field 320 showing services to be provided according to the signal intensity. For example, when a signal intensity of a signal received by the service providing apparatus is −80 [dBm], n is −120<n≤−60[dBm] (see 302), and therefore, a service to be provided in this case is 'Contents A-1.' If a signal intensity of a signal received by the service providing apparatus is −20 [dBm], n is −60<n [dBm] (see 301), and therefore, a service to be provided in this case is 'Contents A-0.'

If the service providing apparatus receives distance information directly from the terminal, differentiated services may be provided to the terminal according to distance information.

In step 230, the service providing apparatus provides the determined services, to the terminal. The service providing apparatus may provide a service directly to the terminal according to ID of the terminal, or the service providing apparatus may provide the service to the terminal via a wireless transmitter/receiver based on unique information of the wireless transmitter/receiver.

Alternatively, if the ID of the terminal that has received a service according to the method of FIG. 2 is stored in the service providing apparatus, differentiated services may also be provided by the service providing apparatus even when the terminal has not entered the vicinity of the wireless transmitter/receiver.

Figure 4:
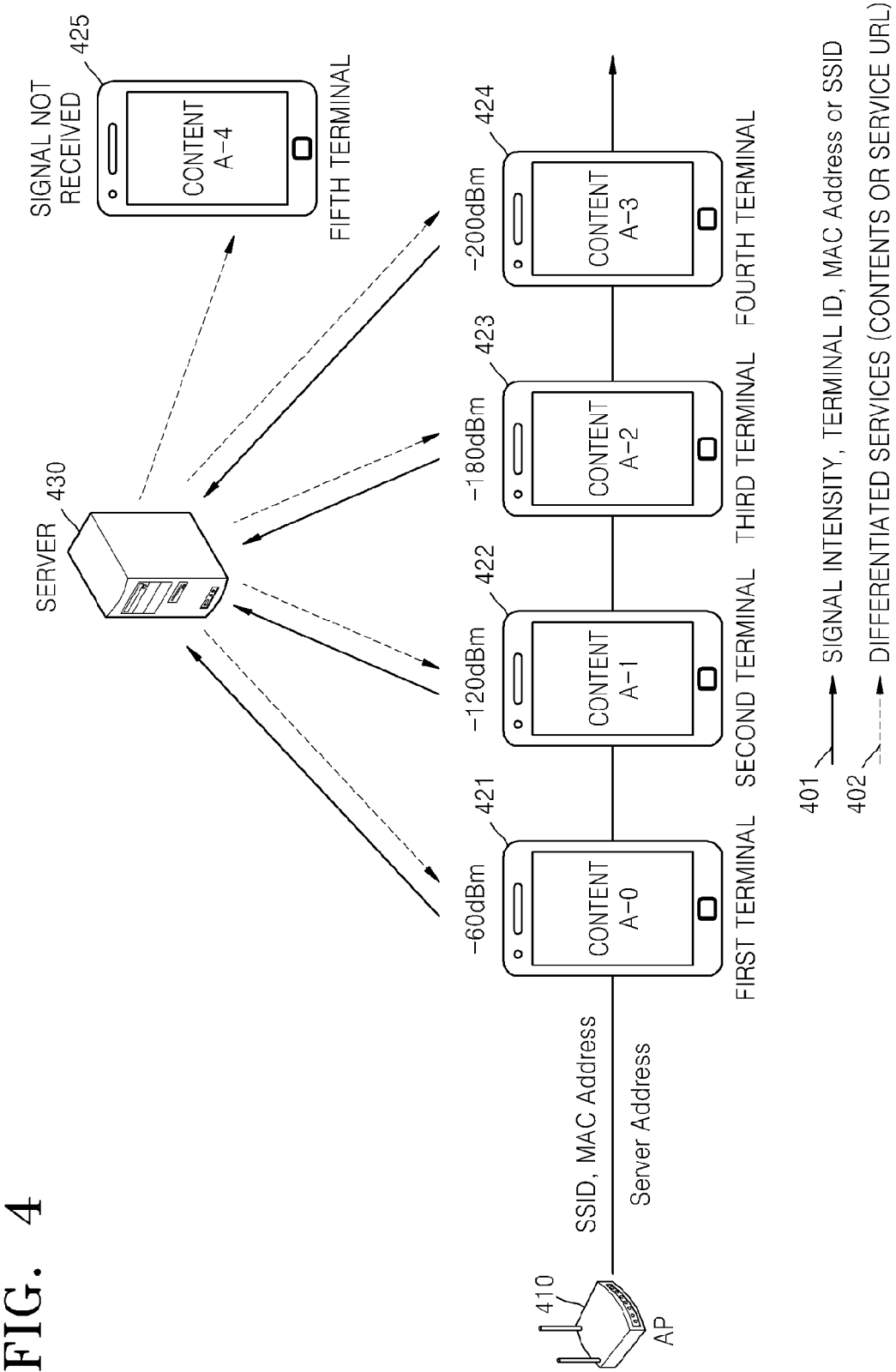
FIG. 4 illustrates a scenario of a differentiated service providing system according to an embodiment of the present invention.

FIG. 4 illustrates a scenario of a differentiated service providing system according to an embodiment of the present invention.

Referring to FIG. 4, a first terminal 421, a second terminal 422, a third terminal 423, and a fourth terminal 424 receive an SSID, a MAC address, and/or an other address of a server 430. The first terminal 421, the second terminal 422, the third terminal 423, and the fourth terminal 424 measure the RSSI of signals received from an AP 410. Signal intensities of the signals received by the first terminal 421, the second terminal 422, the third terminal 423, and the fourth terminal 424 are −60 [dBm], −120 [dBm], −180 [dBm], and −200 [dBm], respectively. The first terminal 421, the second terminal 422, the third terminal 423 and the fourth terminal 424 transmit the SSID or MAC address received from AP 410, the measured RSSI, and IDs of the first through fourth terminals 421 through 424 to the servicer 430 according to the received server address. After transmitting this information, the server 430 provides differentiated services, that is, Contents A-0, Contents A-1, Contents A-2, and Contents A-3 to the first terminal 421, the second terminal 422, the third terminal 423, and the fourth terminal 424. A fifth terminal 425, which has previously received a service from the server 430, may subsequently receive services from the server 430 even when the fifth terminal 425 is not in the vicinity of the AP 410.

Referring to FIG. 4, a solid line arrow 401 denotes information being transmitted from a terminal to the server 430, and a dotted line arrow 402 denotes a service provided from the server 430 to a terminal.

Figure 5:
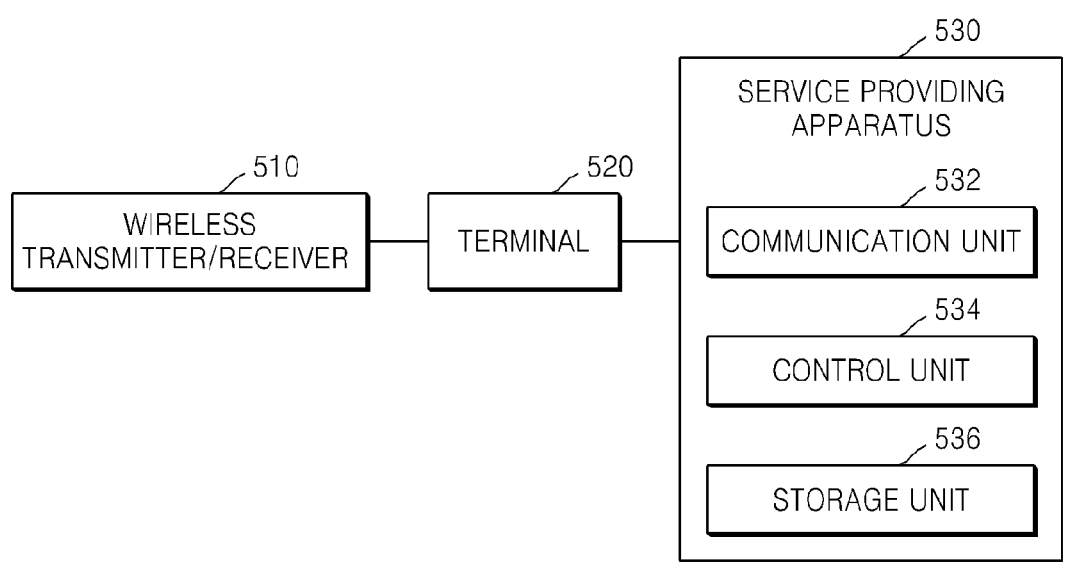
FIG. 5 is a block diagram illustrating a service providing apparatus according to an embodiment of the present invention.

FIG. 5 is a block diagram illustrating a service providing apparatus 530 according to an embodiment of the present invention.

Referring to FIG. 5, the service providing apparatus 530 includes a communication unit 532, a control unit 534, and a storage unit 536. The service providing apparatus 530 is connected to a terminal 520 via a predetermined network. Also, the service providing apparatus 530 may be connected to a wireless transmitter/receiver 510 via a predetermined network.

The communication unit 532 receives, from the terminal 520, information about the wireless transmitter/receiver 510 which the terminal entered the vicinity of the wireless transmitter/receiver 510. The terminal 520 receives a signal including unique information of the wireless transmitter/receiver 510 broadcast by the wireless transmitter/receiver 510 and address information of a server that is to provide a service, that is, of a service providing apparatus. According to the current example according to an embodiment of the present invention, the wireless transmitter/receiver 510 may be a beacon or an AP. In the current example, unique information of a wireless transmitter/receiver may include at least one of a MAC address, an SSID, and a BSSID. When receiving a signal from the wireless transmitter/receiver, the terminal 520 detects a reception intensity of the received signal. Reception intensity may be reported in the form of an RSSI. After the reception intensity is detected, the information about the wireless transmitter/receiver 510, including the unique information of the wireless transmitter/receiver 510 and reception intensity, is transmitted to the service providing apparatus 530. The terminal 520 may also transmit ID of the terminal 520 to the service providing apparatus 530, and when receiving the ID of the terminal 520, the control unit 534 stores the received ID. If it is possible to calculate a distance from the terminal 520 to the wireless transmitter/receiver 510 according to signal intensity, the terminal 520 may transmit information indicating the calculated distance.

The control unit 534 determines differentiated services according to information about the wireless transmitter/receiver 510. The control unit 534 determines differentiated services according to the unique information of the wireless transmitter/receiver 510 and/or signal intensity included in the information about the wireless transmitter/receiver 510. The signal intensity is reference information based on which a distance between the wireless transmitter/receiver 510 and the terminal 520 may be calculated. Accordingly, the service providing apparatus 530 provides differentiated services to the terminal 520 according to the distance between the wireless transmitter/receiver 510 and the terminal 520. In the current example, the terminal 520 may receive, not just a simple service, but differentiated services according the distance between the wireless transmitter/receiver 510 and to the terminal 520. Services may include contents and/or a service URL. However, these services are merely listed as examples, and other services may be provided in accordance with embodiments of the present invention.

The services provided according to the distance may be provided according to the table 300 of FIG. 3, in a manner similar to that explained herein with reference to the operations corresponding to FIG. 2.

If the communication unit 532 receives distance information directly from the terminal 520, the control unit 534 provides differentiated services to the terminal 520 according to distance information.

The control unit 534 may provide a service directly to the terminal 520 according to ID of the terminal 520 or provide a service to the terminal 520 via the wireless transmitter/receiver 510 based on the unique information of the wireless transmitter/receiver 510.

Alternatively, if the terminal 520 has previously received a service as described herein above, the ID of the terminal 520 is stored in the storage unit 536, and the control unit 534 may provide differentiated services even when the terminal 520 is not within the vicinity of the wireless transmitter/receiver 510.

The embodiments of the present invention may include computer readable codes on a computer readable recording medium. Such a computer readable recording medium may include any data storage device that can store data that can be thereafter read by a computer system. Examples of such a computer readable recording medium include Read-Only Memory (ROM), Random-Access Memory (RAM), Compact Disc (CD)-ROMs, magnetic tapes, floppy disks, optical data storage devices, etc. Such a computer readable recording medium can also be distributed over network coupled computer systems so that the computer readable code is stored and executed in a distributed fashion. Functional programs, codes, and/or code segments, which may be used in implementing embodiments of the present invention, can be easily construed by programmers of ordinary skill in the art to which the present invention pertains.

While the present invention has been particularly shown and described with reference to certain embodiments thereof, it will be understood by those of ordinary skill in the art that various changes in form and details may be made therein without departing from the spirit and scope of the present invention as defined by the following claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method for providing a service in a service providing apparatus, the method comprising:
　receiving, from a terminal, unique information of a wireless transmitter and information about a signal intensity of a signal that the terminal has received from the wireless transmitter; wherein the terminal is located within vicinity of the wireless transmitter;
　determining a differentiated service to be provided to the terminal according to the received unique information and the received information about the signal intensity; and
　providing the determined differentiated service to the terminal.

2. The service providing method of claim 1, wherein determining the differentiated service comprises:
　determining a distance between the terminal and the wireless transmitter based on the information about the signal intensity; and
　determining the differentiated service according to the determined distance.

3. The service providing method of claim 1, wherein the wireless transmitter is an Access Point (AP) or a Beacon.

4. The service providing method of claim 1, wherein the unique information of the transmitter includes at least one of a Service Set IDentifier (SSID) and a Media Access Control (MAC) address.

5. The service providing method of claim 1, further comprising:
　receiving, from the terminal, IDentification (ID) information of the terminal; and
　storing the ID information of the terminal, wherein providing the determined differentiated service to the terminal comprises providing the determined differentiated service to the terminal according to the ID information of the terminal.

6. The service providing method of claim 1, wherein providing the determined differentiated service to the terminal comprises providing the service to the terminal via the wireless transmitter.

7. The service providing method of claim 1, wherein the determined differentiated service is at least one of a content and a service Uniform Resource Locator (URL).

8. A service providing apparatus, comprising:
a communication unit configured to receive, from a terminal, unique information of a wireless transmitter and information about a signal intensity of a signal that the terminal has received from the wireless transmitter; wherein the terminal is located within vicinity of the wireless transmitter; and
a control unit configured to determine a differentiated service to be provided to the terminal according to the received unique information and the received information about the signal intensity, and to provide the service to the terminal.

9. The service providing apparatus of claim 8, wherein the control unit configured to determines a distance between the terminal and the wireless transmitter based on the received information about the signal intensity, and to determines the differentiated service according to the determined distance.

10. The service providing apparatus of claim 8, wherein the wireless transmitter is an Access Point (AP) or a Beacon.

11. The service providing apparatus of claim 8, wherein the unique information of the transmitter includes at least one of a Service Set IDentifier (SSID) and a Media Access Control (MAC) address.

12. The service providing apparatus of claim 8, further comprising a storage unit configured to store IDentification (ID) information of the terminal received from the terminal,
wherein the control unit configured to provides the determined differentiated service to the terminal according to the ID information of the terminal.

13. The service providing apparatus of claim 8, wherein the control unit configured to provides the service to the terminal via the wireless transmitter.

14. The service providing apparatus of claim 8, wherein the determined differentiated service includes at least one of a content and a service Uniform Resource Locator (URL).

15. A mobile device, comprising:
a communication unit configured to receive, from a wireless transmitter, unique information of the wireless transmitter; wherein the mobile device is located within vicinity of the wireless transmitter; and
a controller configured to determine a signal intensity of a signal that the mobile device has received from the wireless transmitter, and to provide the unique information and information about the signal intensity to the service providing apparatus;
wherein the communication unit is configured to receive, from the service providing apparatus, a differentiated service which is determined by the service providing apparatus according to the provided unique information and the provided information about the signal intensity.

16. The mobile device of claim 15, the differentiated service is determined by the service providing apparatus according to a distance between the mobile device and the wireless transmitter.

17. The mobile device of claim 15, wherein the wireless transmitter is an Access Point (AP) or a Beacon.

18. The mobile device of claim 15, wherein the unique information of the transmitter includes at least one of a Service Set IDentifier (SSID) and a Media Access Control (MAC) address.

19. The mobile device of claim 15, wherein the communication unit is configured to transmit Identification(ID) information of the mobile device to the service providing apparatus,
wherein the differentiated service is determined by the service providing apparatus according to the ID information of the mobile device.

20. The mobile device of claim 15, the differentiated service is provided from the service providing apparatus via the wireless transmitter.

21. The mobile device of claim 15, wherein the differentiated service is at least one of a content and a service Uniform Resource Locator (URL).

22. A non-transitory computer-readable recording medium having embodied thereon a program for executing a service providing method, the method comprising:
receiving, from a terminal, unique information of a wireless transmitter and information about a signal intensity of a signal that the terminal has received from the wireless transmitter; wherein the terminal is located within vicinity of the wireless transmitter;
determining a differentiated service to be provided to the terminal according to the received unique information and the received information about the signal intensity; and
providing the determined differentiated service to the terminal.

23. A method for receiving a service from a service providing apparatus, the method comprising:
receiving, from a wireless transmitter, unique information of the wireless transmitter; wherein the mobile device is located within vicinity of the wireless transmitter;
determining a signal intensity of a signal that the mobile device has received from the wireless transmitter;
providing the unique information and information about the signal intensity to the service providing apparatus; and
receiving, from the service providing apparatus, a differentiated service which is determined by the service providing apparatus according to the provided unique information and the provided information about the signal intensity.

24. A non-transitory computer-readable recording medium having recorded thereon a program for executing the method of claim 23, by using a computer.

* * * * *